(12) United States Patent
Cox

(10) Patent No.: US 6,325,103 B1
(45) Date of Patent: Dec. 4, 2001

(54) VALUE FOR SEPARATING MATERIAL IN A FLUID STREAM

(75) Inventor: Donald G. Cox, Bagersville, IN (US)

(73) Assignee: Air Equipment & Engineering, Inc., Martinsville, IN (US)

( * ) Notice: Subject to any disclaimer, the term of this patent is extended or adjusted under 35 U.S.C. 154(b) by 0 days.

(21) Appl. No.: 09/680,685

(22) Filed: Oct. 6, 2000

(51) Int. Cl.⁷ .................................................. F16K 11/10
(52) U.S. Cl. ................................................. 137/883; 406/1
(58) Field of Search ............................... 137/883; 406/1, 406/2, 3, 173

(56) References Cited

U.S. PATENT DOCUMENTS

| | | | |
|---|---|---|---|
| 3,039,489 | * 6/1962 | Botkin | 137/883 |
| 3,762,772 | * 10/1973 | Fuss | 406/1 |
| 4,175,591 | * 11/1979 | Welker | 137/883 |
| 4,552,181 | * 11/1985 | Hawkins | 137/875 |
| 4,964,950 | * 10/1990 | Niskanen et al. | 162/100 |

* cited by examiner

Primary Examiner—John Fox
(74) Attorney, Agent, or Firm—Woodard, Emhardt, Naughton, Moriarty & McNett

(57) ABSTRACT

An apparatus for collecting and separating material from a fluid stream. The material is forced in an air stream into a single chamber having a plurality of outlets each with a seperate poppit gate. The interior boundry of the chamber is formed by a plurality of straight sides arranged to direct the incoming fluid stream and material in a swirling fashion resulting in the conveyed material being forced outwardly toward the open outlet.

10 Claims, 2 Drawing Sheets

VALUE FOR SEPARATING MATERIAL IN A FLUID STREAM

BACKGROUND OF THE INVENTION

1. Field of the Invention

The present invention relates generally to the field of valves used to direct fluid streams.

2. Description of the Prior Art

Various types of scrap or trim paper or other materials in the paper and boxboard industry sell for different prices. For example, a mixed bale may sell for $50 per ton whereas the two constituents comprising the bale may sell for $400 and $50 per ton if separated. Thus, it is desirable to separate the constituents in the most economical fashion. Switch valves are used in the paper and box board industry for material separation.

Many manufacturing facilities generate large volume of scrap and trim paper and other materials. For example, an envelope plant may have twenty machines capable of creating five or six different types and values of scrap at any given time. The conventional solution to separating the constituents is to first gather and convey the scrap and trim in a fluid stream. Four or five two-way switch valves are placed in series on the conveying line from a single machine and switch to five or six termination or accumulation points. Switching in this fashion is not only space consuming but is also expensive. Further, when handling paper or scrap pneumatically, rough surfaces or leaking seals can trap and start material buildup. The aforementioned switch valves must be well sealed and have very little leakage so that a sufficient amount of air is retained in the duct to convey material beyond the valves.

In order to provide a more compact and less expensive switch arrangement, I have tried several designs including a fan type horizontal switch valve and a magazine revolver type switch valve. Neither valve could be sealed adequately nor were cost effective.

Disclosed herein is an improved valve of compact design providing the separation of the scrap into its constituents without requiring multiple valves in series and allowing for a more efficient separation of the constituents. The valve includes a single small multi-sided chamber with some of the sides having outlets with gates. Superior sealing is achieved with a single chamber reducing the fluid leakage problems existing in the prior valves. The chamber is designed to eliminate scrap blockage within the valve as the result of the location of the inlet providing a tangential entry into the chamber of the fluid stream with conveyed material. The interior shape of the chamber directs the incoming fluid stream in a swirling direction causing centrifugal separation of the scrap into the particular open outlet.

SUMMARY OF THE INVENTION

One embodiment of the present invention is an apparatus to separate material conveyed in a fluid stream through an inlet conduit receiving the material to be conveyed. A fluid power source is connected to the inlet conduit operable to force the material though the conduit in a fluid stream. A directional valve separates the material from the fluid stream and includes a housing forming a chamber with a fluid inlet connected to the conduit to receive the material therefrom and further with a plurality of fluid outlets. The housing includes a closed interior boundary forming the chamber with an entrance side and the fluid inlet located thereon, a blank side with an interior blank side surface without an outlet located thereon to direct flow of fluid from the fluid inlet along the blank side surface, and a plurality of sides each with interior outlet side surfaces and the fluid outlets located thereon. The side surfaces are arranged in adjacent fashion around the chamber directing the flow of fluid in a swirling fashion. A plurality of gates or valves are mounted to the housing and are located at each of the outlets. The gates have open positions allowing fluid flow through the outlets and out of the chamber and closed positions blocking fluid flow from the chamber.

BRIEF DESCRIPTION OF THE DRAWINGS

FIG. 4 is an end view looking in the direction of arrows 4—4 of FIG. 2.

DESCRIPTION OF THE PREFERRED EMBODIMENTS

Figure 1:
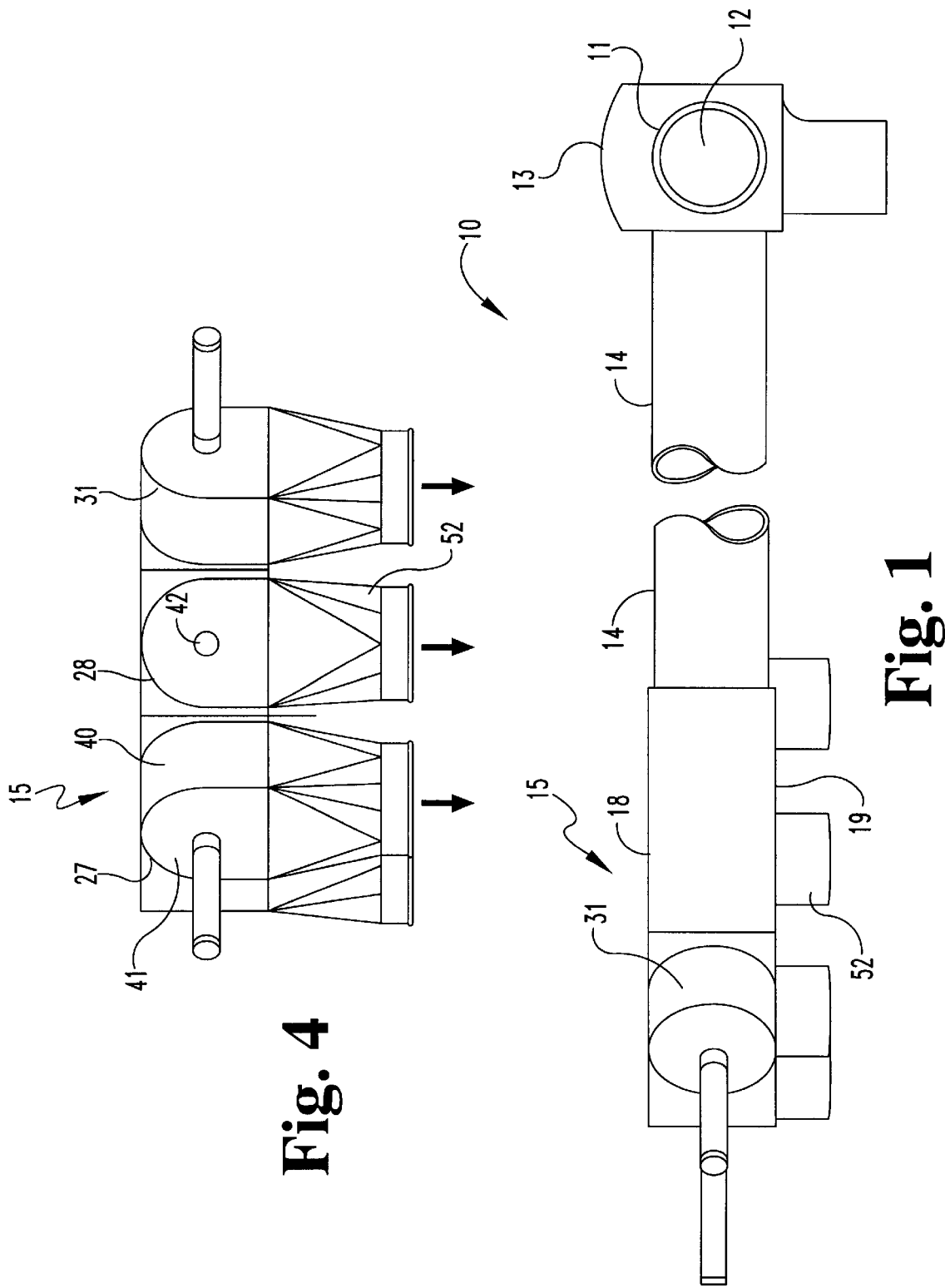
FIG. 1 is a fragmentary side view of a scrap collection and separation apparatus.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an apparatus 10 for collecting and separating material conveyed in the fluid stream. An inlet conduit 11 has an entrance 12 through which the scrap and trim material is introduced. A conventional fluid or air pump 13 is connected to conduit 11 with the pump having an outlet connected to conduit 14. The pump is operable to force fluid or air along with the conveyed material through entrance 12 and then out of the pump via the conduit 14. The pump is sufficiently sized to withdraw the fluid or air and the foreign material through entrance 12 at an entrance velocity sufficiently great to force the conveyed material through conduit 14, valve 15 and out through the outlets of valve 15.

Directional valve 15 is operable to separate the foreign material conveyed into the valve in a fluid stream via conduit 14. Valve 15 includes a housing forming a chamber defined by top wall 18, bottom wall 19, and a plurality of straight side walls. In the preferred embodiment depicted in FIG. 2, seven side walls, 20–26 are provided and are disposed between the top wall 18 and bottom wall 19 defining a chamber having a polygonal interior side wall. Conduit 14, shown in fragment in FIG. 1 for the purposes of clarity, is fixedly mounted to the cylindrical inlet flange 57, in turn, mounted to side wall 20. Conduit 14 is not shown in FIGS. 2–4 to more clearly illustrate the directional valve. The fluid or air stream with conveyed material is thus forced by pump 13 via conduit 14 and cylindrical flange 57 into the hollow interior or chamber 17 of housing 16.

Side walls 20 and 26 are not provided with outlets whereas side walls 21–25 are provided respectively with outlets 27–31. The interior surface 32 of side wall 20 is straight and is arranged at an approximate 90 degree angle relative to the interior straight surface 33 of side wall 26. Surface 33 is arranged at an obtuse angle 70 relative to the interior straight side surface 34 of side wall 25. The remaining side walls have interior straight surfaces arranged at obtuse angles 71 relative to the straight side surfaces of adjacent side walls. For example, interior side surface of wall 24 is arranged at obtuse angle 71 relative to the straight side surface of side wall 25 and also the straight side surface of side wall 23. As a result, the incoming fluid stream first follows a straight line parallel with side surface 33 and then bends in a clockwise direction as viewed in FIG. 2 following the surfaces of the remaining side walls thereby providing a fluid flow in a swirling fashion. Thus, the incoming fluid stream is directed tangentially along the interior boundary of chamber 17.

A plurality of valves are mounted to walls 21–25 with each valve gate operable to open and close the cylindrical outlets provided in side walls 21–25. The gate or valve may be a slide gate or poppit valve. In the preferred embodiment shown in FIGS. 2 and 3, the valves are poppit valves and include sealing gaskets movable to and from ports in housing 16 by means of air cylinders having movable piston rods with the gaskets mounted to the distal ends thereof.

Outlet 28 including its poppit valve will now be described it being understood that a similar description applies to the remaining outlets 27, and 29 through 31, each of which includes a poppit valve. Outlet 28 includes a curved outer wall 40 sealingly mounted to wall 22(FIG. 3) of housing 16. A back wall 41 is sealingly mounted to wall 40 and has an air cylinder 42 mounted thereon. The air cylinder includes an extendable piston rod 43 having a distal end with a pair of plates 44 and 45 mounted thereon and a sealing gasket 46 mounted between plates 44 and 45. Plate 46 has a smaller diameter compared to port 47 whereas plate 44 has a larger diameter along with gasket 46 relative to the port. The air cylinder is operable to extend rod 43 until plate 45 extends through port 47 and gasket 46 sealingly engages wall 22 around the circumference of the port 47 provided in wall 22. In order to open port 47, cylinder 42 retracts rod 43 and moves gasket 46 apart from port 47 to the retracted position adjacent wall 41 allowing fluid flow from within chamber 17(FIG. 2) and into chamber 48 formed within outlet 28. A bottom wall 50 is mounted to outlet 28 and includes an opening 51(FIG. 3) connected to outlet conduit 52(FIG. 4) mounted to wall 50 allowing fluid flow from chamber 48 into outlet conduit 52 leading to the discharge destination.

Figure 2:
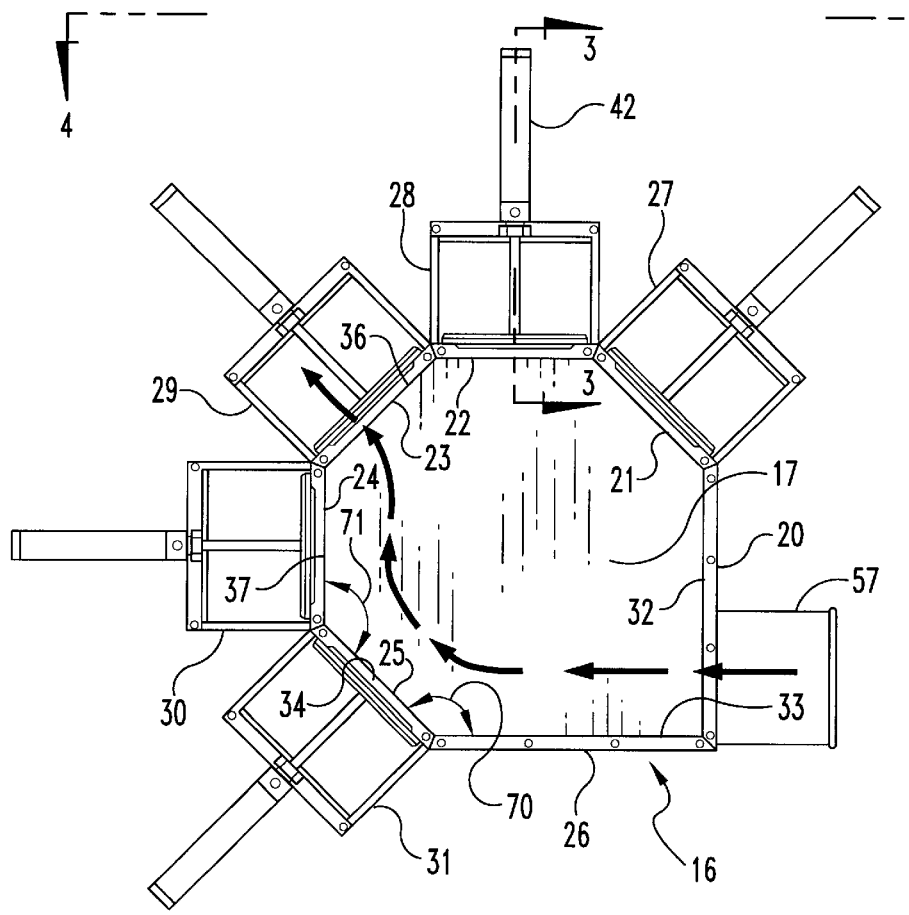
FIG. 2 is an enlarged, fragmentary top view of the fluid valve incorporated into the system of FIG. 1.
Figure 3:
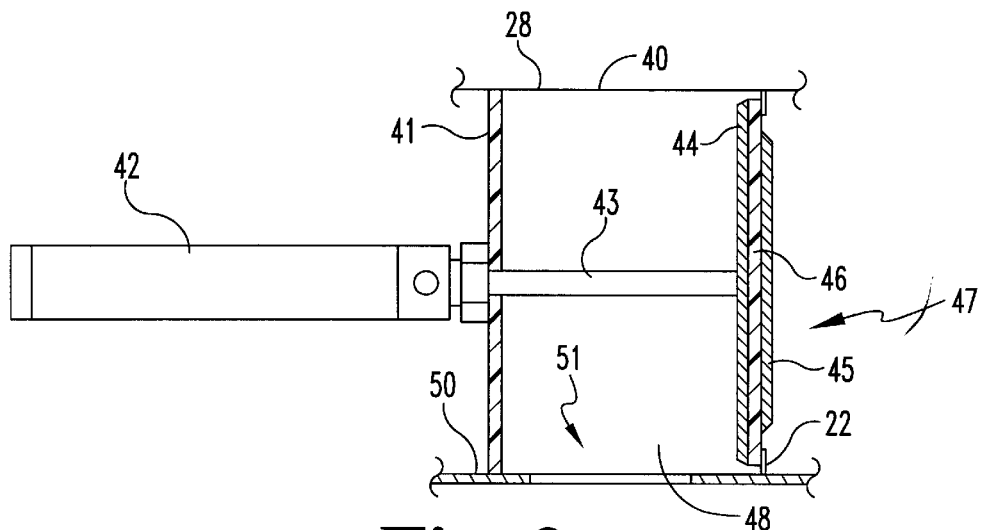
FIG. 3 is an enlarged fragmentary cross-sectional view taken along the line of 3—3 of FIG. 2 and viewed in the direction of the arrows with the outlet closed.

Air and material enter the valve 15 via inlet 57 leading into chamber 17 and swirl in a clockwise direction as viewed in FIG. 2. One of the valves associated with outlets 27–31 is open at all times allowing the air and conveyed material to eventually pass from chamber 17 through the open poppit valve and then to the final destination via one of the outlet conduits 52.

In an alternate embodiment the valves are slide valves and include a wall slidably mounted within the outlets to sealingly close or open the ports, such as port 47. A conventional power means, such as an air cylinder is operable to move the slide gate to the open position or closed position whereat fluid flow from chamber 17 is blocked. The power means may be a pneumatic, hydraulic, or electrical device to move its outlet piston rod attached to the slidable wall.

Valve 15 includes conventional electrical circuitry to ensure that only a single valve gate is open at any one time. Thus, with the valve gate open for outlet 29, the remaining four valves for outlet 27, 28, 30, and 31 are in the closed position. In such a state, the fluid stream will exit the chamber only via outlet 29. Due to the velocity of the fluid stream, not all of the fluid will immediately exit via outlet 29 and instead a portion of the fluid will flow past outlet 29 eventually being combined with the new incoming fluid entering the chamber via inlet 57 thereby providing a clockwise, as viewed in FIG. 2, swirling fluid flow. The foreign material conveyed by the fluid flow is forced outwardly due to the centrifugal force generated by the swirling fluid flow thereby positioning the material being conveyed adjacent the outer side walls. The swirling flow further ensures that the conveyed material does not build up at any one location but instead flows with the fluid stream to the outlet in the open condition whereat the material can exit the chamber via the open outlet. Conventional electrical circuitry allows the operator to open the appropriate outlet depending upon the material being conveyed. For example, valve 15 includes five outlets which, in turn, are connected by suitable conduits to five separate storage bins. In the event material "A" is being conveyed in the fluid stream then the operator may open the one outlet 27–31 which is connected to the storage bin for material "A". In the event the material being conveyed is material "B", then the operator may open the particular outlet 27–31 connected to the storage bin for material "B" while closing the remaining outlets. In similar fashion, the valve is operable to direct three additional different types of materials. In the event a combined material, namely, material "A" and material "B", is being conveyed at the same time, then valve 15 is operable to direct the combined material to a single storage bin.

Valve 15 has a height between top wall 18 and bottom wall 19 approximately equal to the diameter of the inlet 57 as well as the diameters of the outlets 27–31. With the fluid stream and the material flowing into chamber 17 and with all outlets closed but one outlet, the turbulence and swirling fluid flow within chamber 17 results in the eventual flow of the conveyed material out of the chamber. In the event the foreign material is not initially swept from the chamber through the outlet port on the first pass, then the material left in the chamber will be eventually reentrained in the fluid stream and swept from the box.

A particular advantage of valve 15 is that the valve provides a better seal than conventional rotating blade valves and with the advantage that the cylinder gate operators are less expensive than conventional rotary operators. The tangential entry into the chamber of the fluid and conveyed material ensures that most of the conveyed material will concentrate along the outer surface of the chamber and thus be more easily stripped from the air stream and exhausted through the open outlet.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid valve for directing fluid with conveyed material comprising:
   a housing forming a chamber having a fluid inlet to receive fluid with conveyed material and a plurality of fluid outlets, said housing including a closed interior boundary forming said chamber;
   a plurality of poppit valves movably mounted to said housing and each located at each of said outlets, said valves having open positions allowing fluid flow through said outlets and out of said chamber and closed positions blocking fluid flow from said chamber; and, power means connected to said valves and operable to move each of said valves to and from said open positions and said closed positions, and wherein:

said closed interior boundary has a polygonal shape with multiple sides, said outlets are each located on a separate one of said sides, and said multiple sides include an entrance side with an entrance side surface and said fluid inlet located thereon, a normal side without an outlet located thereon and having an interior normal side surface arranged generally perpendicular to said entrance side surface and directing flow of fluid in a straight direction from said fluid inlet along said normal side surface, and a first outlet side having an interior first outlet side surface with one of said fluid outlets located thereon, said multiple sides having additional interior side surfaces arranged in adjacent fashion around said chamber directing said flow of fluid in a swirling fashion.

2. The fluid valve of claim 1 wherein:

said multiple sides further include a directing side with an interior directing side surface located between said normal side surface and said interior first outlet side surface, said directing side surface arranged at an obtuse angle relative to said normal side surface and relative to said interior first outlet side surface directing said flow of fluid in said swirling fashion.

3. The fluid valve of claim 2 wherein:

each of said additional interior side surfaces are arranged at obtuse angles relative to each other to direct said fluid flow tangentially along said interior boundary limiting material buildup at any one of said outlets while said material in said fluid moves outwardly under centrifugal force as said fluid with conveyed material swirls in said chamber.

4. A fluid valve for directing fluid with fluid conveyed material comprising:

a housing forming a chamber with an fluid inlet to receive fluid with conveyed material and further with a plurality of fluid outlets, said chamber including a closed interior boundary, an entrance side with said fluid inlet located thereon, a blank side having an interior blank side surface without an outlet located thereon to direct flow of fluid from said fluid inlet along said blank side surface, and a first outlet side having an interior first outlet side surface with one of said fluid outlets located thereon, said chamber having multiple sides with additional interior side surfaces arranged in adjacent fashion around said chamber directing said flow of fluid in a swirling fashion; and, a plurality of valves mounted to said housing and each located at each of said outlets, said valves having open positions allowing fluid flow through said outlets and out of said chamber and closed positions blocking fluid flow from said chamber.

5. The fluid valve of claim 4 wherein:

each of said additional interior surfaces are arranged at obtuse angles relative to each other to direct said fluid flow tangentially along said additional interior surfaces limiting material buildup at any one of said outlets while said material in said fluid moves outwardly under centrifugal force as said fluid swirls in said chamber.

6. The fluid valve of claim 5 wherein:

said chamber includes an intermediate interior surface without an outlet located thereon positioned between said blank side surface and said first outlet side surface to direct said fluid flow in a swirling fashion and arranged at obtuse angles relative to said blank side surface and said first outlet side surface.

7. An apparatus to separate material conveyed in a fluid stream comprising:

an inlet conduit with an inlet to receive material to be conveyed in a fluid stream;

a fluid power source connected to said inlet conduit operable to force said material though said conduit in a fluid stream;

a directional valve to separate said material from said fluid stream, said directional valve including a housing forming a chamber having a fluid inlet connected to said conduit to receive said material therefrom and having a plurality of fluid outlets, said housing including a closed interior boundary forming said chamber and including an entrance side with said fluid inlet located thereon, a blank side having, an interior blank side surface without an outlet located thereon to direct flow of fluid from said fluid inlet along said blank side surface, and a plurality of sides each having interior outlet side surfaces with said fluid outlets located thereon, said side surfaces arranged in adjacent fashion around said chamber directing said flow of fluid in a swirling fashion; and, a plurality of poppit valves mounted to said housing, and each located at each of said outlets, said valves having open positions allowing fluid flow through said outlets and out of said chamber and closed positions blocking fluid flow from said chamber.

8. The apparatus of claim 7 wherein:

said valves include power means to open and shut said valves with only one of said valves in an open position at any one time.

9. The apparatus of claim 8 wherein:

said chamber includes any number of said outlets with said valves and further includes a single inlet.

10. The apparatus of claim 7 wherein:

said interior outlet side surfaces are arranged at obtuse angles relative to each other, whereas said blank side surface is arranged at generally a perpendicular angle to said entrance side.

\* \* \* \* \*